(No Model.)
M. VON DOLIVO-DOBROWOLSKY.
APPARATUS FOR INDICATING DIFFERENCE OF PHASE.
No. 549,449.                                          Patented Nov. 5, 1895.
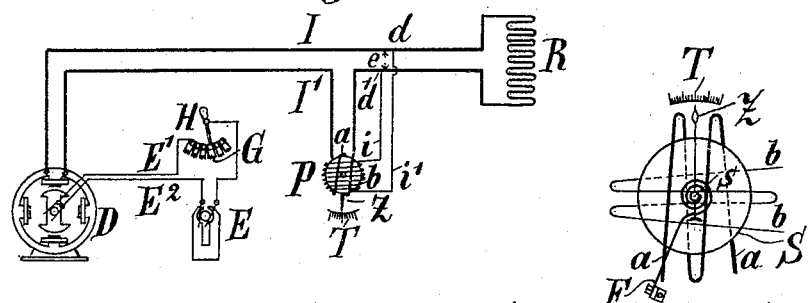
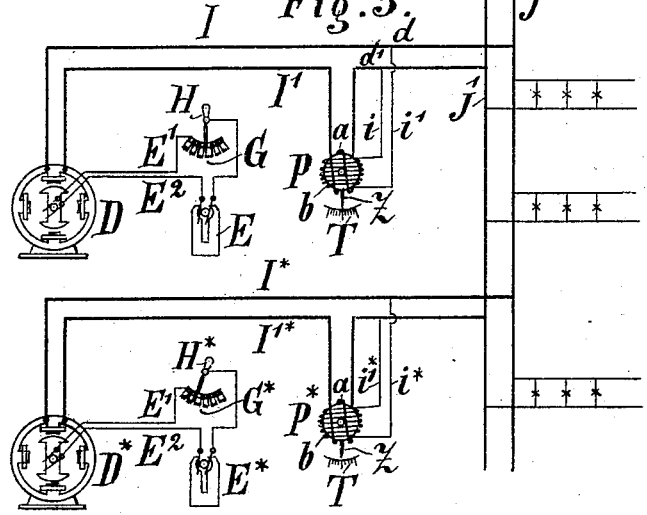
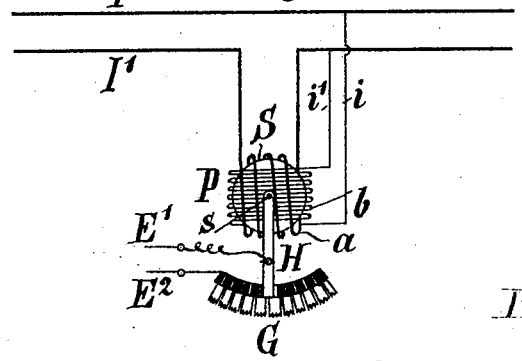
Witnesses
Inventor
Michael von Dolivo-Dobrowolsky
by Marcellus Bailey
his attorney.

UNITED STATES PATENT OFFICE.

MICHAEL VON DOLIVO-DOBROWOLSKY, OF BERLIN, GERMANY, ASSIGNOR TO THE ALLGEMEINE ELEKTRICITÄTS-GESELLSCHAFT, OF SAME PLACE.

APPARATUS FOR INDICATING DIFFERENCE OF PHASE.

SPECIFICATION forming part of Letters Patent No. 549,449, dated November 5, 1895.

Application filed April 20, 1895. Serial No. 546,456. (No model.) Patented in England December 15, 1892, No. 23,113, and in Germany April 14, 1892, No. 69,159.

*To all whom it may concern:*

Be it known that I, MICHAEL VON DOLIVO-DOBROWOLSKY, a subject of the Emperor of Russia, residing in Berlin, Kingdom of Prussia, German Empire, have invented a new and useful apparatus for indicating any lag or advance between the phase of an electric alternating current and that of the electromotive force or pressure of the same current, (for which I have obtained patents in Great Britain, No. 23,113, bearing date December 15, 1892, and in Germany, No. 69,159, bearing date April 14, 1892,) of which the following is a specification.

The present invention has for its object to provide an apparatus for indicating any lag or advance that may occur between the phase of an electric alternating current and that of the electromotive force or pressure of the same current, as also to enable this apparatus to automatically correct the said difference—*i. e.*, to re-establish coincidence between the current and the pressure phases. This apparatus is based on the well-known fact that when a metallic body is rotatably arranged within the magnetic fields of two coils or sets of coils set at an angle to each other, and when these coils or sets of coils are fed with alternating currents, the said metallic body will be caused to rotate. This fact in nature I have already made use of for detecting, indicating, and measuring any difference that exists or may occur between the phases of two alternating currents having a like number of alternations. The apparatus I have constructed for this purpose is described and claimed in my United States Patent No. 540,153 of May 28, 1895. I have discovered that the same principle, when applied in a somewhat-modified form, may also be employed for detecting, indicating, and measuring any lag or advance occurring between the phase of an alternating current and that of the electromotive force or pressure of the same current. For this purpose it is only needed to cause a metallic body to be acted upon by a magnetic field created by the co-operation of the full current and a small part of the same derived at a proper point through the medium of two coils or sets of coils arranged relatively to each other, as set forth. As long as there is coincidence of the current and pressure phases, the said metallic body will have no motion imparted to it, but will stand at the neutral or zero point. When, however, this coincidence is broken, the metallic body will be caused to turn to the right or to the left, according as the current is caused to lag relatively to its electromotive force or to be in advance of the same. The apparatus for indicating the said non-coincidence may be, and preferably is, constructed as described in my said specification, with this difference, that one coil or set of coils is wound with wire of such thickness as to be capable of conducting the whole current and is to be placed in one of the mains, while the other coil or set of coils is constructed with fine wire, so that it affords a high resistance, and is to be placed in a shunt branched off from the two mains at points in advance of the translating apparatus to be fed.

To re-establish the coincidence of the current and pressure phases when altered from any cause, the exciting current of the generator has to be increased or decreased, according as there is lagging or advancing of the current-phase, and in order to cause this re-establishment to take place automatically I make the said rotary body the motor of the handle for putting the resistance-coils into and out of the exciting-circuit of the generator, so that the oscillations of the body have the effect of producing the required increase or decrease of the exciting-current, according as the said body is caused to move to the one or to the other side. The said non-coincidence between the current and pressure phases is one frequently occurring in plants where a number of alternators work in parallel on a common external circuit. By combining each of the generators with a phase meter, as set forth, I am enabled to detect and correct the same at an early moment and to prevent thereby the alternators from getting out of step.

On the annexed sheet of drawings, Figure 1 is a diagram of a phase-meter constructed as described in my said Patent No. 540,153 and modified as set forth; Fig. 2, a diagram illustrating the present invention as applied to a plant in which but one alternating-current generator works on the main circuit; Fig. 3, a diagram showing the invention as used with a plant in which two alternating-current generators are caused to work in parallel on the same main circuit, and Fig. 4 a diagram showing the arrangement for automatically re-establishing the coincidence between the current and pressure phases.

In Fig. 1, S indicates the rotatably-arranged metallic body; $s$, the spindle on which the same is mounted; $a$ and $b$, the two coils or sets of coils surrounding the body S in being set at right angles to each other; F, the spiral spring fixed at one end to the spindle $s$ and at the other end to a stationary point, so as to counteract the impulse given to the body S through the medium of the magnetic fields created by the coils $a$ and $b$ when fed with current; Z, a pointer moving with said body S, and T a scale, these parts forming in their combination the phase-meter P. One coil or set of coils, as shown in the figure the set of coils $a$, is wound with thick wire, so that it is enabled to conduct the full current of the generator with which the apparatus is to be combined, while the other coil or set of coils, according to the figure the set of coils $b$, is constructed with fine wire, so as to afford a considerable resistance.

As shown in the diagram Fig. 2, in which R is a current-translating apparatus or plant, I I' the main circuit for feeding the same with alternating current, D the generator producing this current, E its exciter, E' E² the exciting-circuit, G the series of resistance-coils for regulating the exciting-current, H the actuating-handle for these resistance-coils, and P the phase-meter, the coil $a$ of the latter is placed in or forms part of one of the mains—for instance, the main I'—while the coil $b$ is placed in or forms part of a shunt-circuit $i$ $i'$, branched off in the points $d$ $d'$ from the mains I I'.

The current circulating through the shunt $i$ $i'$, and consequently through the coil $b$, has an intensity which is proportional to the electromotive force or pressure $e$ existing between the points $d$ $d'$, at which the shunt-circuit is branched off from the main circuit. When the main current coincides in phase with its electromotive force $e$, it then nearly coincides in phase with the current passing through the shunt-circuit $i$ $i'$, and the phase-meter will have no motion imparted to it, so that its pointer Z stands on the zero-point of scale T. When, however, according to the special nature of the current-translating apparatus R, the main current—i. e., the current passing from the generator D through the mains I I' to the apparatus R—is caused to lag relatively to the pressure $e$, or to be in advance of the same, a like difference will take place between the phase of the main current and that of the current circulating in the shunt-circuit $i$ $i'$ and cause the movable part S of the phase-meter to oscillate to the right or to the left, moving with it the pointer Z. The arc or angle through which the latter is thus caused to move gives the measure for the difference that has taken place between the current and pressure phases.

The above-described arrangement is very useful in plants where several alternating-current generators work in parallel on a common external circuit, as it permits to detect whether each of the generators is properly excited or not and how to correct the excitement.

In Fig. 3 such a plant is shown in which, for instance, two alternating-current generators, respectively D and D*, are assumed to work in parallel on a common external circuit, J J', I I', and I* I'*, respectively, being the conductors establishing electrical connection between the former and the latter. Each generator is combined with a phase-meter, respectively P and P*, in the manner described with reference to Fig. 2, the thick-wire coils $a$ being placed in the mains, respectively I' and I'*, and the fine-wire coils $b$ in the shunts, respectively $i$ $i'$ and $i^*$ $i'^*$, branched off from the conductors, respectively I I' and I* I'* at the points $d$ $d'$. G G* denote the series of resistance-coils to be put in or out of the exciting-circuits E' E², fed with current from the exciters, respectively E and E*, and H and H* indicate the actuating-handles for said resistance-coils.

As long as the work of the generators is "normal," the phase-meters P and P' will behave the same—i. e., they will depend on the translating apparatus only. Under "normal working" is to be understood that each generator receives as much power as corresponds to the excitement of its electromagnets, so that the work is done without the synchronizing power of the generators intervening. Now experience has shown that the generators easily get out of step when the excitement of the same is not in proportion to the power received. Before, however, this getting out of step takes place in a plant devised as illustrated in Fig. 3 deflections differing in direction are observed on the individual phase-meters—viz., those meters which are combined with generators subject to stronger excitement will be seen to deflect to one side, while the meters of those generators which receive a weaker exciting-current are oscillating to the other side. Thus the different exciting-currents can be corrected according to the indications of the phase-meters and thereby the alternators prevented from getting out of step.

In order to dispense with constant observing of the phase-meters, the arrangement may be so made as to enable each meter to automatically correct the excitement of the generator with which it is combined. Such an arrangement is diagrammatically represented in Fig. 4. P is the phase-meter; S, the movable part of the same; G, the series of resistance-coils for regulating the exciting-current, and H the handle for actuating said coils. As shown, this handle is connected with the spindle $s$ of the movable part S of the phase-meter, so as to move with the same. If any sensible difference takes place between the current and pressure phases of the generator, (which is omitted from the drawings,) the part S, in turning to the right or to the left, moves the handle with it, so as to increase or to diminish the number of resistance-coils in the exciting-circuit $E'$ $E^2$ until the proper excitement is restored.

I am aware that two coils or sets of coils placed at an angle to each other and fed with alternating currents have already been combined with a movable metallic body placed within their magnetic fields for the purpose of producing rotary motion and indicating any difference between the phases of two electric alternating currents, and I therefore do not, broadly, claim such an arrangement; but

What I claim as my invention is—

1. The combination with an alternating current generating machine, the mains leading from the same and current translating apparatus connected with the said mains, of a shunt circuit branched off from the said mains, a thick wire coil or set of such coils placed in one of the mains, a fine wire coil or set of such coils placed in the said shunt circuit and set at an angle to the thick wire coil, a metallic body rotatably arranged in the magnetic fields of said coils or sets of coils, a device for opposing a counterforce to the rotation of said metallic body, and means for indicating the amplitude of the latter, substantially as and for the purpose specified.

2. The combination with an alternating current generator, the exciting circuit for the same, the resistance coils for regulating the exciting current, the mains leading from the generators, and current translating apparatus connected with the mains, of a shunt circuit branched off from the said mains, a thick wire coil or set of such coils placed in the said shunt circuit and set at an angle to the thick wire coil, a metallic body rotatably arranged in the magnetic field of the said coils or sets of coils, a mechanical connection between this body and the handle for putting the resistance coils into and out of the exciting circuit, and a device for opposing a counterforce to the rotation of the said metallic body, substantially as and for the purpose specified.

3. The combination with an alternating current generator, the exciting circuit for the same, the resistance coils for regulating the exciting current, the mains leading from the generators, and current translating apparatus connected with the mains, of a shunt circuit branched off from the said mains, a thick wire coil or set of such coils placed in one of the mains, a fine wire coil or set of such coils placed in the said shunt circuit and set at an angle to the thick wire coil, a metallic body rotatably arranged in the magnetic field of the said coils or sets of coils, a mechanical connection between this body and the handle for putting the resistance coils into and out of the exciting circuit, a device for opposing a counterforce to the rotation of the said metallic body and means for indicating the amplitude of the latter, substantially as and for the purpose specified.

In testimony whereof I have hereunto set my hand in the presence of two subscribing witnesses.

MICHAEL VON DOLIVO-DOBROWOLSKY.

Witnesses:
ANTON WEBER,
KARL WILKENS.